US009611660B2

(12) United States Patent
Goode

(10) Patent No.: US 9,611,660 B2
(45) Date of Patent: Apr. 4, 2017

(54) VEHICLE CORNER RAIL ASSEMBLY

(71) Applicant: Tobin Michael Goode, Granger, IN (US)

(72) Inventor: Tobin Michael Goode, Granger, IN (US)

(73) Assignee: Titan Distribution, LLC, Elkhart, IN (US)

(*) Notice: Subject to any disclaimer, the term of this patent is extended or adjusted under 35 U.S.C. 154(b) by 0 days.

(21) Appl. No.: 14/698,278

(22) Filed: Apr. 28, 2015

(65) Prior Publication Data

US 2015/0307138 A1 Oct. 29, 2015

Related U.S. Application Data

(60) Provisional application No. 61/985,047, filed on Apr. 28, 2014.

(51) Int. Cl.
*B60R 13/06* (2006.01)
*B60R 13/04* (2006.01)
(Continued)

(52) U.S. Cl.
CPC .............. *E04F 19/022* (2013.01); *B60P 3/36* (2013.01); *B62D 33/04* (2013.01); *E04F 19/064* (2013.01);
(Continued)

(58) Field of Classification Search
CPC .... B62D 29/045; B62D 33/04; B62D 33/046; B62D 29/048; E04F 13/06; E04F 2013/063; E04F 19/02; E04F 19/022; E04F 19/024; E04F 19/028; E04F 19/064; E04F 13/0733; B60R 13/04; B60R 13/043; B60R 13/06;
(Continued)

(56) References Cited

U.S. PATENT DOCUMENTS 2,346,630 A * 4/1944 Wagner .................. B60R 13/04
296/210
3,090,087 A * 5/1963 Miller .................... E04F 13/06
217/69
(Continued)

FOREIGN PATENT DOCUMENTS

CN 205615932 U * 10/2016

OTHER PUBLICATIONS 4 page machine translation of CN 205615392 U, run from Google Patents on Jan. 12, 2017.*

*Primary Examiner* — Robert Canfield
(74) *Attorney, Agent, or Firm* — Varnum, Riddering, Schmidt & Howlett LLP

(57) ABSTRACT

A corner rail assembly (156) is adapted to be coupled to a corner section (114) of a recreational vehicle (100). The assembly includes a jacket (158) having a main body (160), first leg (162) and second leg (164). A metal insert (180) is formed within an extrusion of said jacket (158). A securing tape (188) in the form of a VHB tape secures the jacket (158) to a front wall (110) of the vehicle (100). A further tape (190) located on an inner side of said first leg (162) affixes the first leg (162) to the side wall (112) of the vehicle (100). A vinyl gimp (192) is releasably coupled to the corner rail assembly (156). A further embodiment of the corner rail assembly (200) includes a mushroom cap insert (216) in place of the vinyl gimp (192).

18 Claims, 4 Drawing Sheets

(51) Int. Cl.
  *E04F 19/02*   (2006.01)
  *E04F 19/06*   (2006.01)
  *B62D 33/04*   (2006.01)
  *B60P 3/36*    (2006.01)
  *B62D 29/04*   (2006.01)
  *B62D 31/00*   (2006.01)

(52) U.S. Cl.
  CPC ............ *B60R 13/04* (2013.01); *B62D 29/045* (2013.01); *B62D 31/00* (2013.01)

(58) Field of Classification Search
  CPC .... E04B 1/66; B60J 10/21; B60J 10/34; B60J 10/35; B60J 10/45; B27D 27/023
  USPC ..... 52/35, 287.1, 469, 716.2, 716.5, 717.03, 52/717.04, 717.05, 312, 272
  See application file for complete search history.

(56) References Cited

U.S. PATENT DOCUMENTS

| | | | | |
|---|---|---|---|---|
| 3,200,547 | A * | 8/1965 | Johnson | E04F 19/028 206/586 |
| 3,388,523 | A * | 6/1968 | Evans | B60R 13/04 293/128 |
| 3,408,250 | A * | 10/1968 | Finefrock | E04F 19/04 156/291 |
| 3,543,465 | A * | 12/1970 | Jackson | B29C 70/74 293/1 |
| 3,635,787 | A * | 1/1972 | Shanok | B44C 5/04 156/211 |
| 3,687,502 | A * | 8/1972 | Loew | B60R 13/04 293/120 |
| 3,843,475 | A * | 10/1974 | Kent | B60R 13/04 156/244.12 |
| 3,934,385 | A * | 1/1976 | Paulus | F16B 5/121 24/294 |
| 4,012,878 | A * | 3/1977 | Ellingson | E04F 19/028 248/345.1 |
| 4,127,974 | A * | 12/1978 | Wendt | E04B 2/7457 52/287.1 |
| 4,188,765 | A * | 2/1980 | Jackson | 428/122 |
| 4,274,237 | A * | 6/1981 | Hagstrom | B44C 5/02 52/312 |
| 4,617,220 | A * | 10/1986 | Ginster | E06B 7/2309 428/122 |
| 5,045,374 | A * | 9/1991 | Tucker | E04F 13/04 428/122 |
| 5,088,252 | A * | 2/1992 | Antekeier | A47B 95/00 52/242 |
| 5,108,801 | A * | 4/1992 | Takahashi | B60R 13/04 24/292 |
| 5,219,626 | A * | 6/1993 | Irrgang | B29C 45/14631 293/128 |
| 5,553,431 | A * | 9/1996 | Pelosi, Jr. | E04F 19/045 52/272 |
| 6,212,836 | B1 * | 4/2001 | Larson | E04F 13/06 52/255 |
| 6,263,630 | B1 * | 7/2001 | Bennett | E04F 19/028 52/174 |
| 6,863,009 | B1 * | 3/2005 | Driver | B63B 59/02 114/219 |
| 7,735,891 | B2 * | 6/2010 | Goode | B62D 29/045 296/29 |
| 8,480,161 | B2 * | 7/2013 | Pfaff | B62D 33/04 296/180.4 |
| 2003/0056453 | A1 * | 3/2003 | Young | E04F 19/022 52/255 |
| 2004/0020143 | A1 * | 2/2004 | Webb | E06B 5/10 52/204.53 |
| 2012/0148779 | A1 * | 6/2012 | O'Brien | B60R 13/04 428/40.6 |
| 2013/0285406 | A1 * | 10/2013 | Siegel | B60P 3/34 296/1.08 |

* cited by examiner

VEHICLE CORNER RAIL ASSEMBLY

CROSS-REFERENCE TO RELATED APPLICATIONS

This application claims priority of and is based on U.S. Provisional Patent Application Ser. No. 61/985,047 filed Apr. 28, 2014.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

Field of the Invention

The invention relates to devices for facilitating the sealing of joints at the corners of structures such as recreational vehicles, towable trailers, buildings and similar structures, and, more particularly, to corner rail extrusions for facilitating such joint sealing.

Background Art

The general concept of employing means for facilitating sealing of joints in the construction of structures such as towable trailers, motorized recreational vehicles, buildings (particularly metal buildings) and similar structures is known in the prior art. For many of these types of structures, a substantially rigid frame is provided, which consists of structural support members, such as studs. The structural support members of the frame support and mount walls on the exterior of the frame. The walls are formed as prefabricated panels placed on the exterior of the frame formed by the structural support members. Corners are formed at the junctures of adjacent panels lying in different, but typically perpendicular planes. Also typically, one of the adjacent panels is intended to overlap the adjacent support member by the thickness of the adjacent panel. In this manner, the adjacent panels lie in perpendicular planes which meet at a butt joint. With respect to the foregoing description, and also with respect to subsequent description regarding to the joint structures, it should be emphasized that concepts associated with the invention are not limited to any one specific type of joint. That is, concepts associated with the invention may be utilized with respect to various types of joints, without departing from the spirit and scope of the novel concepts of the invention.

In the practice of prior art methods of construction, the tolerances in the dimensions of prefabricated panels are typically not sufficiently small so as to permit the assembly of adjacent walls and proper butt joints. Accordingly, the adjacent panels lying in perpendicular planes typically meet to form an internal (or reverse) 90° opening (or gap), rather than a true butt joint. For purposes of sealing, and as known in the prior art methods of construction, a layer of butyl tape may be sandwiched between the panels and an extruded metal corner rail. By nature, the butyl tape is somewhat tacky, and can be temporarily secured by its inherent tackiness to the inner surface of the extruded corner rail during assembly. With the corner rail, butyl tape and the underlying panel are secured to adjacent and underlying support members by means of mechanical fasteners, such as screws (or, in the case of truck applications, pop rivets). The butyl tape then migrates from being compressed is then need to be trimmed to size.

One disadvantage of the use of butyl tape is the density of the tape. Butyl tape is typically of such a density that it does not conform to corrugations, variations or other irregularities in the exterior surface of the panels. Accordingly, gaps are left which can then lead to water or other types of leakage or damage. Correspondingly, the butyl tape does not conform to the gap (or internal (reverse) 90° angle) formed at the juncture of adjacent panels meeting in perpendicular planes. Instead, the butyl tape simply spans the gap without conforming to the edges of the panels. Accordingly, the butyl tape does not perform a proper sealing function at the aforementioned gap and, further, creates a channel through which water can run, thereby infiltrating the joint. The use of butyl tape is further disadvantageous in that butyl tape typically dries out and chemically breaks down after a period of use. The butyl tape can then fall out, resulting in further gaps into which water can infiltrate. Still further, the use of butyl material has another disadvantage, in that it tends to expand when subjected to heat and, further, is subject to migration away from pressure, such that the butyl tape tends (when exposed to hot weather) to creep away from the fasteners and corner rail. This creeping movement creates gaps which can permit further water infiltration, as well as create cosmetic problems.

Other devices are known for purposes of facilitating the sealing of corner joints, with respect to other types of corners and panel elements. For example, Larson, U.S. Pat. No. 6,212,836 issued Apr. 10, 2001 describes a self-aligning drywall corner bead. The corner bead includes an arcuately profiled elongated central portion. The central portion includes two lateral edges for defining a concave and a convex surface. Flanges extend from each of the lateral edges and are unilaterally formed therewith. The concave surface includes a pair of longitudinal rails extending at about 90° one from the other, at the geometrical center line of a concave surface. The rails serve to align the corner bead with the underlying drywall, when applied over a drywall corner in a conventional manner.

A substantial advance in the relevant art was provided in Goode, U.S. Pat. No. 7,735,891 issued Jun. 15, 2010. The Goode patent describes a corner rail extrusion which was adapted to be applied to a corner section of the vehicle, with the section comprising a series of studs forming a frame. The studs mounted and supported walls of the vehicle, where the walls consisted of a series of prefabricated panels, including a side wall a rear wall.

Each of the walls could include two opposing sides and a series of edges. The sides included an outer first side and a second inner side. The rear wall also included an outer first side and a second inner side. The side wall included a first edge at the location of the corner formed by the side wall and the rear wall. The rear wall also included a corresponding first edge. The first edges would meet at a perpendicular plane so as to form a gap.

Specifically, the disclosed corner rail extrusion included a pair of outwardly and generally perpendicular extending legs. The legs included first and second legs. The legs were integrally connected at one end of each of the legs. In addition, the corner rail extrusion included a central bulbous interior. The central bulbous interior was positioned so as to expand the corner formed by the side wall and the rear wall, with the bulbous interior fitting into the gap.

In accordance with the foregoing, it was an object of the Goode patent to provide a method of constructing corners of motorized vehicles and the like. The corners were constructed so as to facilitate leak resistance by means of the minimization or substantial elimination of gaps through which water or other materials could infiltrate. Additionally, a concept behind Goode was to provide a durable and long lasting seal between a corner rail and underlying adjacent panels at a corner of the vehicle or similar structure.

Advantageously, the corner with the corner rail extrusion of Goode could be assembled by one person. Also, a positive seal was substantially formed against the junction between adjacent panels. The corner rail extrusion as disclosed in Goode also provided compensation for fabrication tolerances. In addition, the corner rail extrusion of Goode could accommodate and compensate for variations in panel surface smoothness.

It is an object of the present invention to provide for a corner rail extrusion which eliminates the need for screws or other mechanical fasteners. In addition, the present invention eliminates holes and leak paths. Still further, the present invention accommodates for mismatch of walls occurring during assembly. In addition, the current invention eliminates the need for butyl tape and caulk.

With the present invention, legs can be permanently adhered to the vehicle unit, with 3M or similar tape. Still further, it is an object of the present invention to reduce installation time. In addition, the present invention provides for dimensional stability, with self-sealing legs. Still further, the present invention includes a mushroom cap design, which allows for color matching with decals, and facilitates replacement and repair with track insert designs.

SUMMARY OF THE INVENTION

In accordance with the invention, a corner rail extrusion is provided for application to corner sections of recreational vehicles and the like. The corner sections are assumed to comprise a series of studs forming a frame, with the studs mounting supporting walls of the vehicle. The walls can consist of a series of prefabricated panels, including side walls, rear walls and front walls. Also, the corner sections can involve all corners of a vehicle unit, including those associated with a roof and/or floor.

The corner rail extrusion includes a relatively small aluminum insert. A PVC jacket is extruded around the insert. The extrusion comprises a first exterior leg for sealing against the wall of the vehicle. A second leg, in the form of a taped outside leg will maintain the extrusion secured to the outside wall. In addition, a VHB tape can be utilized to secure the extrusion to the unit, without requiring screws, fasteners or similar devices. The absence of such devices will serve to prevent holes and leak paths.

The corner rail extrusion in accordance with the invention is also flexible, and can therefore meet the radius or contour of any vehicle wall design, without having to incur the expense of pre-bent pieces. Since the attachment is maintained as described above, no additional sealants or butyl tape are needed.

Although the jacket may preferably be formed from PVC material, the jacket can be made from additional materials, such as thermoplastics, ethylene propylene or neoprene. The aluminum insert (which may comprise other materials) facilitates maintaining the dimensional stability of the rail extrusion during different temperature cycles. In addition, with appropriate plastics, it is also possible that the aluminum insert can be omitted.

More specifically with respect to the invention, the corner rail extrusion may include a corner rail assembly having UV stability, paintable, high level of chemical resistance and temperature resistance of −40° F. to 200° F., said jacket comprising a first leg which overlaps a portion of said first wall, a second leg which abuts said second wall and functions so as to create a positive seal against said second wall, and a main body positioned intermediate said first leg and said second leg. Adhering means are provided for adhering the first leg to the first wall. Securing means are positioned intermediate the main body and the second wall, so as to secure the jacket to the second wall. The adhering means and the securing means provide for affixing the corner rail assembly to the first and second walls, without requiring screws, mechanical fasteners or other connecting means which would require the formation of holes and/or leak paths.

In accordance with other aspects of the invention, the corner rail assembly includes a jacket having at least a minimum degree of flexibility. The jacket includes a first leg overlapping a portion of the first wall, and a second leg which abuts said second wall, with a main body positioned intermediate the first and second legs. An insert is formed within an extrusion of the jacket, with the insert functioning so as to maintain dimensional stability of the corner rail assembly during differing temperature cycles.

The metal insert includes an elongated main body, with a lip extending angularly from one end of the main body of the middle insert. A convex section protrudes outwardly from the second wall, and adjacent an end of the metal insert opposing the end of the metal insert to which the lip of the metal insert is integrally formed. The adhering means comprises an elongated two-sided tape.

The securing means comprises an elongated two-sided tape or liquid adhesive. The securing tape comprises VHV tape. The jacket is manufactured through an extrusion process and is composed of PVC material.

In accordance with other concepts of the invention, the first leg is substantially longer than the second leg. The assembly also includes an elongated channel located outwardly from the main body of the jacket. A gimp is provided which has an elongated and flexible configuration. The gimp is adapted to be releasably received within the elongated channel. The gimp can be composed of vinyl material.

The assembly also includes a first outer projection extending outwardly from one end of the main body of the jacket. A second outer projection extends outwardly from an opposing end of the main body of the jacket. A first lip extends laterally from the first outer projection. A second lip extends laterally from the second outer projection, and extends toward the first lip. A first slot is formed by a portion of the main body of the jacket, with the outer projection and the first lip. A second slot is formed by a further projection of the main body, a second outer projection and the second lip. The channel is formed by the first slot, the second slot, and an interior area formed therebetween.

One end of the gimp is received within the first slot, and an opposing end is received within the second slot. The assembly is constructed and secured to the corner section without the need for the use of butyl tape, caulk, or mechanical fasteners. The sizing and configuration of the corner rail assembly accommodates for mismatch of the first and second walls during assembly. The corner rail assembly is patentable.

The rail assembly can include a mushroom-shaped cap releasably received within elements of the rail assembly. The caps substantially cover the exterior of the corner rail assembly. The mushroom cap functions so as to allow for color matching with decals and the like, and further functioning so as to be readily replaceable and repairable. The mushroom cap eliminates any need for a gimp or a similar element to be associated with the corner rail assembly.

The mushroom cap includes a mushroom-shaped portion with a convex configuration facing outwardly from the main body of the jacket. A T-shaped structure is extending inwardly toward the main body of the jacket and is integral with or otherwise connected to the curved main body of the convex section. The T-shaped structure comprises a first projection adapted to be releasably received within the first inner slot, and a second projection adapted to be releasably received within the second inner slot.

BRIEF DESCRIPTION OF THE SEVERAL VIEWS OF THE DRAWING

The invention will now be described with reference to the drawings, in which.

DETAILED DESCRIPTION OF THE INVENTION

Figure 1:
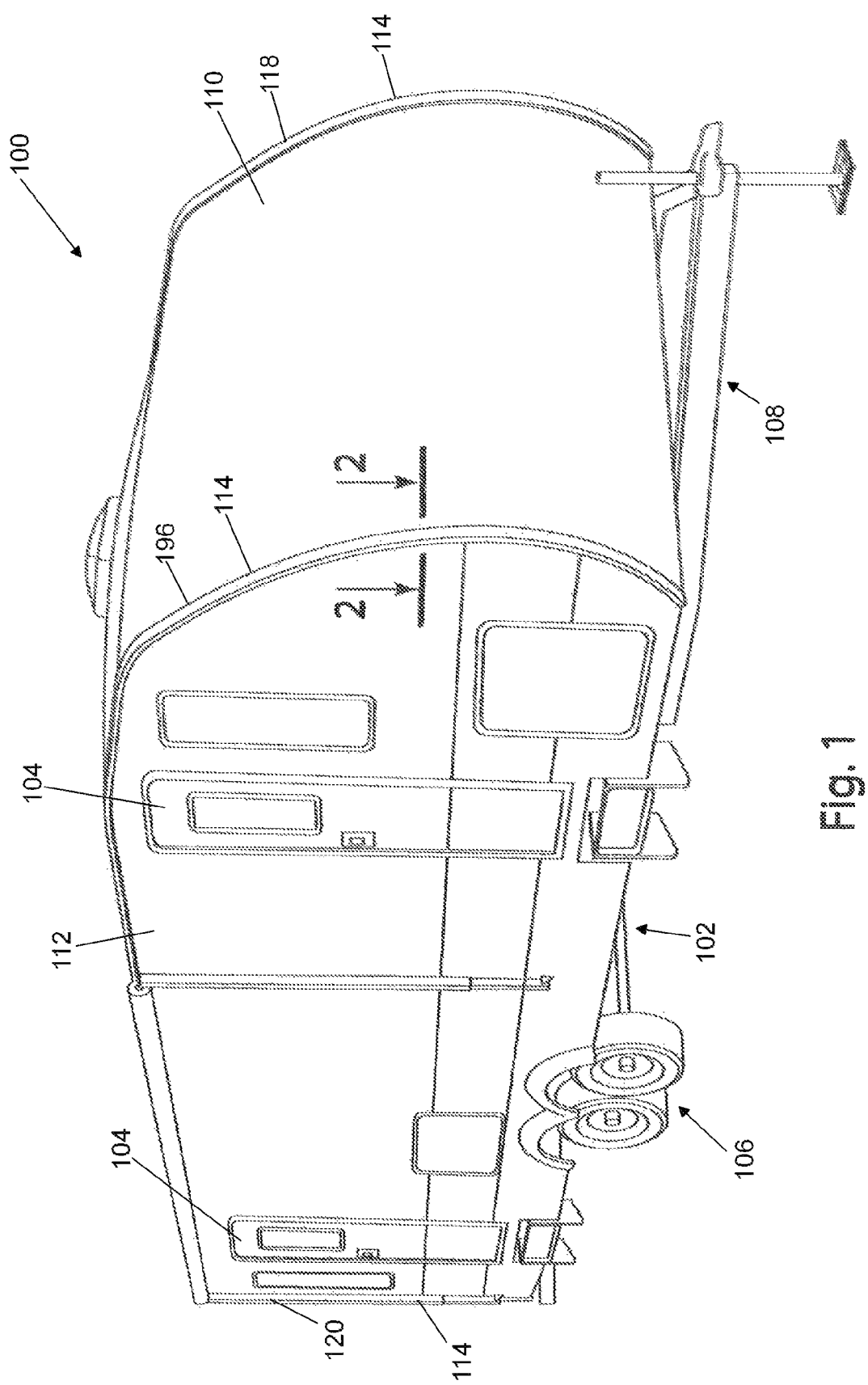
FIG. 1 is a perspective view of an example recreational vehicle to which corner rail extrusions in accordance with the invention can be applied.

The principles of the invention are disclosed, by way of example, through the use of corner rail extrusions which may be applied to corner sections of a recreational vehicle, with various elements associated with the invention illustrated in FIGS. 1-5. The disclosure set forth in the following paragraphs and within the drawings describe two embodiments of corner rail extrusions in accordance with the invention. These embodiments are shown specifically with respect to a recreational vehicle as illustrated in FIG. 1. However, it should be understood that the methods and structures disclosed herein in accordance with the invention are applicable to other structures, such as motorized vehicles and buildings (particularly metal buildings).

Prior to describing the current embodiments of corner rail extrusions in accordance with the invention, a brief description of one embodiment of a corner rail extrusion currently being used in the recreational vehicle industry will be described. The current extrusion is in the form of an aluminum extrusion used to conceal the corners of RV units, once constructed. The extrusions are mechanically fastened to the unit, which can create holes and leak paths. To help prevention of leaking, a piece of butyl tape is used under the extrusion when fastened on. The butyl will actually fight the aluminum, since it is not easily compressed, and create additional leak paths in some instances, because the product is so dense that it will keep the aluminum away from the wall when it is screwed down. The assembler will also need to go over the installed extrusion, and caulk along each edge as a secondary seal, so as to aid in leak protection. When installed, a piece of gimp (which may be in the form of white vinyl) is installed between the two top tabs of the extrusion, so as to hide the exposed screw heads and potential leak paths. When the gimp is installed, the gimp actually acts as a gutter for water to come inside, and stay trapped within the extrusion. When the water is between the extrusion and the gimp, it will tend to run back and forth, until the water finds a way into the extrusion.

When the butyl tape is applied to the back of the rail, it is secured at the bottom with a screw or fastener. The rail is typically straight, and the unit to which it is being applied may be radiused. This presents difficulty during the installation process, in that the installer must get the rail to lay flat against the unit and try to create a seal. Often, additional capital is expended to buy pre-bent extrusions so as to match the contour of the unit. However, one pre-bent extrusion often will not be sufficient so as to match the unit's shape.

After the butyl is applied, the vinyl gimp is installed and folded under the bottom of the aluminum trim. This prevents water from going up into the trim, but also prevents water that enters from the top from escaping. First, the rail is screwed down (often, every six inches) until the entire rail is affixed to the unit. The gimp is then placed in the tabs throughout its entire length, and the rail attachment is complete. One disadvantage with the foregoing configuration is that the screws are now creating constant pressure on the butyl, with the butyl continuously leaking out from under the rail. This requires constant trimming, not only before it can be caulked, but also for the life of the RV.

According to the embodiments of the invention, and with reference to FIG. 1, the drawing illustrates, in perspective view, a conventional recreational vehicle (or "RV") 100. Recreational vehicles of this type typically include a main body 102, one or more doors 104 and two or more wheel structures 106 (only one wheel structure 106 being shown in FIG. 1). If the RV is a towable RV, such as the RV 100 shown in FIG. 1, the RV 100 will also include a hitch 108 for purposes of coupling to a motorized truck or similar vehicle.

In addition to the foregoing, the RV 100 will also include a front wall 110. In the particular vehicle 100 shown in FIG. 1, the front wall 110 has an arcuate or curved shape. Extending rearwardly from each corner of the front wall 110 is a side wall 112. Only one of the side walls 112 is shown in FIG. 1, with the other side wall being opposed and having a structure substantially similar to that of the visible side wall 112 in FIG. 1. The RV 100 can also include a rear wall, which is not shown in the drawings.

As further shown in FIG. 1, the RV 100 includes corner sections 114. With the particular vehicle 100 shown in FIG. 1, there can be four corner sections 114. One of the corner sections 114 is a first front corner section 116 formed between the front wall 110 and the side wall 112 which is visible in FIG. 1. A further corner section 114 consists of second front corner section 118, forming the boundary between the front wall 110 and the particular side wall 112 which is not visible in FIG. 1. Additional ones of the corner sections 114 include a first rear corner 120. The rear corner 120 is visible in FIG. 1, and forms the boundary between the side wall 112 visible in FIG. 1 and the rear wall (not shown). A further one of the four corner sections 114 would form the boundary between the rear wall and the side wall 112 which is not visible in FIG. 1.

Figure 2:
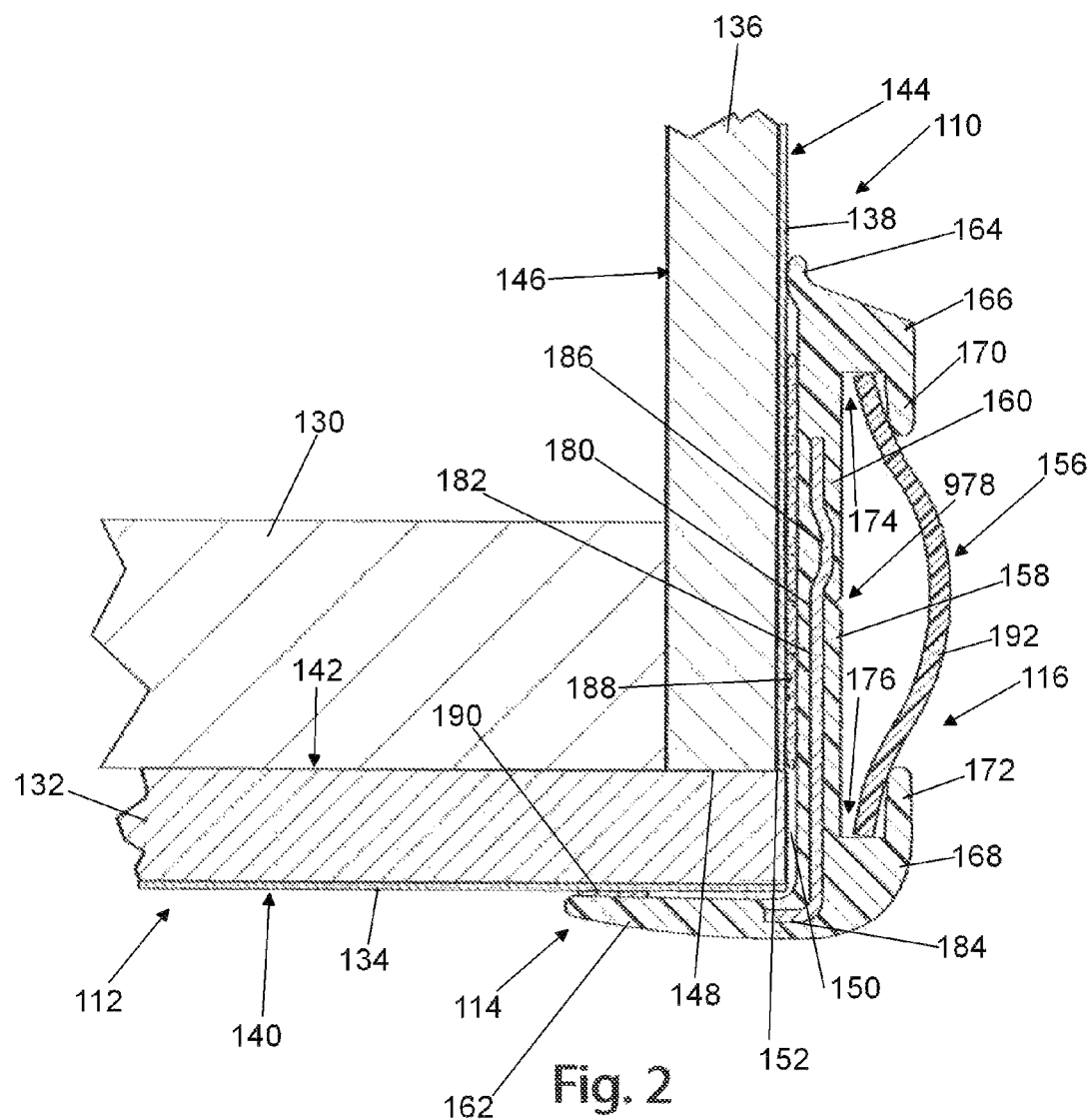
FIG. 2 is a sectional plane view of a corner rail extrusion in accordance with the invention, with the extrusion used at the corner of a side wall and front wall, and with the drawing taken along section lines 2-2 of FIG. 1.

FIG. 2 illustrates a sectional view of the first front corner 116, taken along section lines 2-2 of FIG. 1. Recreational vehicles of the type shown as RV 100 typically comprise a frame, with the frame comprising a plurality of structural members. In FIG. 2, a structural member is shown as stud 130. Such studs 130 can be wooden, metal or comprise other materials. The frame which consists of these studs 102 typically defines the periphery of the recreational vehicle or enclosures within the vehicle. The studs 130 mount and support walls of the vehicle, which may consist of a series of prefabricated panels forming the walls. As previously described with respect to FIG. 1, the panels can include side walls 112 and a front wall 110. A typical recreational vehicle, such as RV 100, will also include a rear wall. As shown further in FIG. 2, the adjacent panels or walls 110, 112 can essentially be perpendicular to each other, and meet at or adjacent to the stud 130 so as to form the inner corner 152.

Each of the panels or walls 110, 112 include two opposing sides and a series of edges. For example, with reference to FIG. 2, the side wall 112 includes an outer first side 140 and an inner second side 142. Correspondingly, the front wall 110 includes an outer first side 144 and an inner second side 146. Still further, at the location consisting of the corner 152 formed by the walls 110, 112, the front wall includes a first edge 148. Correspondingly, the side wall 112 includes a first edge 150. The first edges 148, 150 essentially form a 90° angle between the side wall 112 and the front wall 110. At the same time, however, it should be noted that the front wall 110 has an arcuate or curved shape.

Further, in accordance with the invention, FIG. 2 illustrates the use of a corner rail assembly 156 (also referred to herein as a "corner rail extrusion"). The corner rail assembly 156 is further shown in FIG. 3 in a stand-alone configuration. More specifically, the corner rail assembly 156 includes a jacket 158. The jacket 158 may be formed of polyvinyl chloride, commonly abbreviated as "PVC". PVC material has a number of advantages over various other types of materials, including chemical resistance, biological resistance and other advantageous properties. For example, the jacket 158 is flexible in structure. Accordingly, the jacket 158 can be shaped so as to meet the radius or contour of any particular vehicle design, without having to incur the expense associated with pre-bent pieces. Further, it is advantageous for the material being used for the jacket 158 to be "UV Stable," meaning that sunrays will not affect the quality of the jacket 158, and will not exhibit UV degradation.

Although the jacket 158 may be preferably formed from PVC material, it should be noted that other materials may be utilized, without departing from the principal concepts of the invention. For example, thermoplastics may be utilized. Such materials can be formed of ethylene propylene, neoprene or the like.

Figure 3:
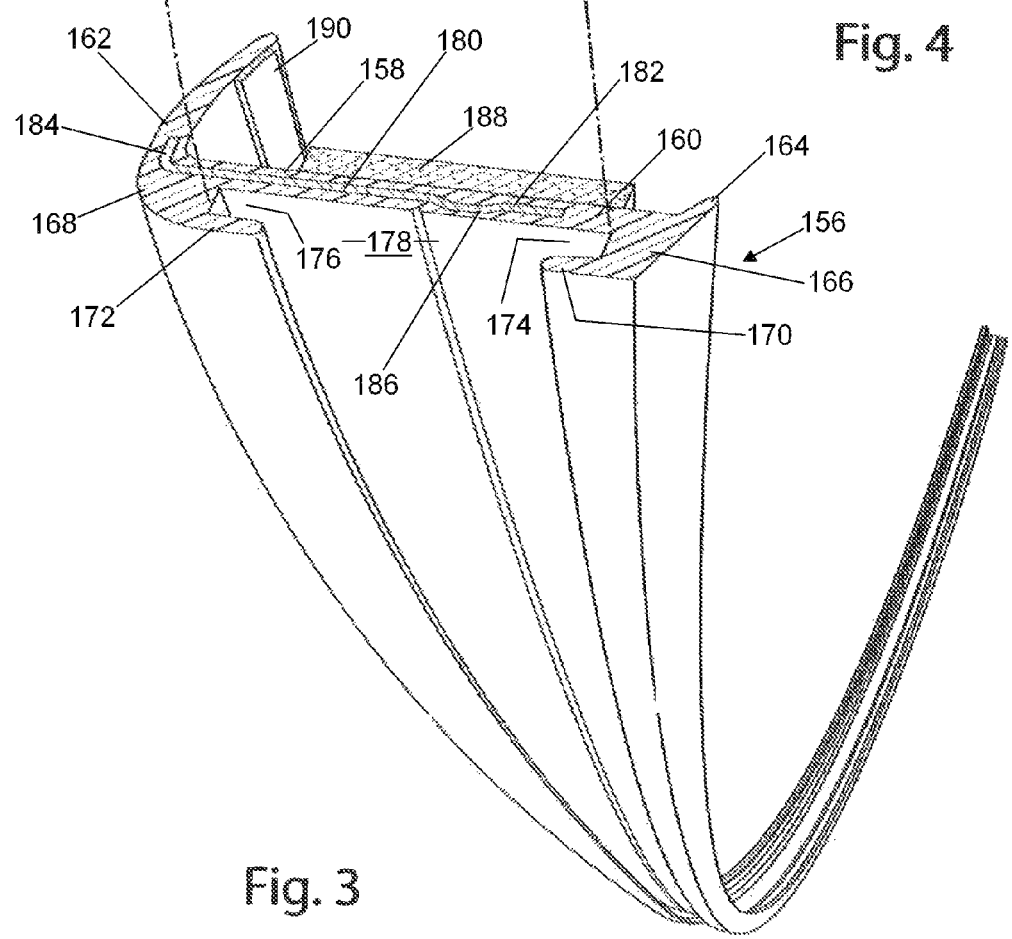
FIG. 3 is a partial perspective, exploded and stand-alone view of the corner rail extrusion shown in FIG. 2, and with the vinyl gimp positioned separate from the remainder of the corner rail extrusion in a position to be inserted into the main body of the extrusion.

As shown primarily in FIGS. 2 and 3, the jacket 158 is structured so as to have an elongated main body 160. The main body 160 is positioned adjacent the first edge 148 of the first prefabricated panel 132 and the outer first side 144 of the second prefabricated panel 136.

Extending perpendicular from the main body 160 of the jacket 158 is an elongated first leg 162. As specifically shown in FIG. 2, when appropriately positioned at the first front corner 116 of the RV 100, the first leg 162 is adjacent the skin 134 and the outer first side 140 associated with the first prefabricated panel 132.

As further shown in FIG. 2, and as also shown in FIG. 3, an outside leg tape 190 is positioned adjacent the end of the first leg 162 of the jacket 158, on the inner side of the first leg 162. The leg tape 190 can be formed from various materials. For example, the 3M™ Company provides a tape which is known as a "VHB™" tape (the term "VHB" standing for "very high bonding".) Still further, another 3M™ product which may be used as the leg tap 190 is commercially available under the product identification "Extreme Sealing Tape." In general, any number of commercially available styles of liquid adhesive or tape may be utilized for the leg tape 190. The outside leg tape 190 provides a means for securing the first leg 162 to the skin 134 associated with the first prefabricated panel 132.

Extending integrally from the end of the jacket 158 opposing the particular end of the jacket 158 which is integral with the first leg 162, is a second leg 164, shown in both FIGS. 2 and 3. The leg 164 is relatively shorter in length than the first leg 162. As shown in FIG. 2, the second leg 164 abuts the skin 138 associated with the second prefabricated panel 136. It should be noted that the second leg 164 is shown in FIG. 2 in an angled configuration. Further, the leg is being shown in a compressed or "positively actuated" state. The second leg 164 functions so as to essentially seal the jacket 158 and corner rail assembly 156 against the skin 138 of the second prefabricated panel 136.

In addition to the foregoing structure of the corner rail assembly 156, the rail assembly 156 includes a metal insert 180. The metal insert 180 advantageously functions so as to maintain the dimensional stability of the corner rail assembly 156 during different temperature cycles. Preferably, the metal insert 180 is constructed of aluminum material. However, alternative metals of different grades could be utilized. In addition, a higher durometer plastic having similar physical properties could also be utilized. Regardless of the particular materials utilized for insert 180, the PVC would continue to be over molded. That is, the overall process would not change. Further, the extensive amount of research currently being performed with respect to plastics is causing relatively rapid introduction of new plastic materials having various advantageous characteristics. Accordingly, it is possible that certain plastics currently exist, or may be developed in the near future, where such plastics or similar materials have the dimensional stability during differing temperature cycles which is provided currently in accordance with the invention through the use of the metal insert 180. In such event, it may be possible to construct the corner rail assembly 156 without the need for the metal insert 180, so long as such materials have all the necessary physical and chemical characteristics required in accordance with the invention.

Figure 4:
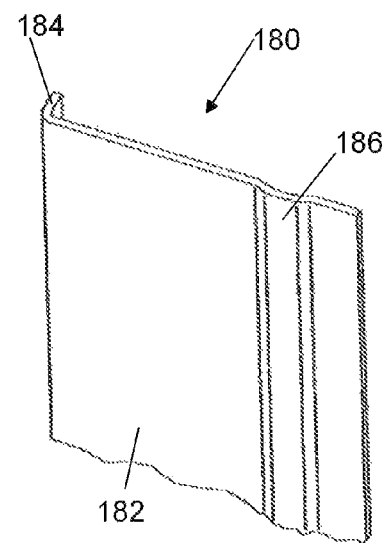
FIG. 4 is a perspective, stand alone and partial view of the metal insert utilized in the corner rail extrusion as shown in FIGS. 2 and 3.

As shown in both FIGS. 2 and 3, the metal insert 180 is formed through extrusion of the PVC portion of the jacket 158 around the metal insert 180. A stand-alone illustration of a cutaway portion of the metal insert 180 is illustrated in FIG. 4. With reference thereto, the metal insert 180 includes an elongated main body 182 which extends longitudinally along the entire length of the insert 180. At one end of the main body 182 is a structure which could be characterized as a lip 184 which forms an angle relative to the main body 182. The lip 184 extends partially into the first leg 162 of the jacket 158. On the opposing side of the main body 182 is a longitudinally extending curved portion 186. The curved portion 186 can be characterized as being convex in structure where it extends outwardly relative to the RV 100. The curvature of the curved portion 186 serves so as to provide a pleat, or otherwise allow the metal to bend easier than it would if the element had a straight configuration. Convex portion 186 of the metal insert 180 is positioned somewhat adjacent to the end of the metal insert 180 which opposes the end of the main body 182 to which the lip 184 is integrally formed.

In addition to the foregoing elements, the corner rail assembly 156 will also include a securing tape 188. The securing tape 188 functions so as to secure the corner rail assembly 156 to the skin 138 associated with the second prefabricated panel 136. In accordance with the invention, the securing function occurs without the necessity of screws, fasteners or other connecting means which may form holes or other areas through which water may travel. Accordingly, the use of the securing tape 188 serves so as to prevent the existence of holes and other leak paths. In addition to the use of securing tape 188, numerous other differing styles of tapes and other components could be utilized, without departing from the spirit and the scope of the novel concepts of the invention. For example, the securing tape 188 could be one of a number of tape styles. Also, instead of tape, it is also possible to utilize various one-component and two-component adhesives which are readily commercially available. Such adhesives would preferably have a fast set time or what is characterized as a high "green strength or tack." Any of the foregoing tape and adhesives may be utilized.

The securing tape 188 is a double-sided tape. One type of tape which may be particularly preferable is known as "VHB" tape. The abbreviation "VHB" stands for "very high bond." One type of known VHB tape is manufactured by and commercially available from 3M™.

With further reference to FIGS. 2 and 3, the jacket 158 of the corner rail assembly 156 includes a first outer projection 166 extending outwardly from the second prefabricated panel 136. Correspondingly, on an end of the main body 160 opposing the end from which the first outer projection 166 extends, a second outer projection 168 extends from the main body away from the second prefabricated panel 136. Extending laterally from the first outer projection 166 is a first lip 170 having the configuration shown on FIGS. 2 and 3. Correspondingly, a substantially identical second lip 172 extends laterally from the second outer projection 160. The first lip 170 and the second lip 172 are essentially mirror images of each other.

The main body 160, first outer projection 166 and first lip 170 essentially form a first slot 174. Correspondingly, a second slot 176 is formed by the main body 160, second outer projection 168 and second lip 172. Formed between these first and second slots 174, 176, respectfully, is a channel 178 formed adjacent the central portion of the main body 160 of jacket 158.

Again with reference to FIGS. 2 and 3, the corner rail assembly 156 can further include a gimp 192. In FIG. 2, the gimp 192 is shown in a flexed configuration positioned within the channel 178 and captured by the first slot 174 and the second slot 176. In FIG. 3, the gimp 192 is shown in a partial cut-away configuration, and also in an exploded view relative to the remaining portion of the corner rail assembly 156. The term "gimp" refers to an elongated structure in the form of a trim for various applications. The gimp 192 may preferably be constructed of vinyl. The vinyl gimp 192 may be white or any other color which decoratively matches the overall colors of the corner rail assembly 156 and the RV 100. The gimp 192 can be flexible in nature, and sized and configured so as to provide the convex or otherwise curved configuration shown in FIG. 2.

Figure 5:
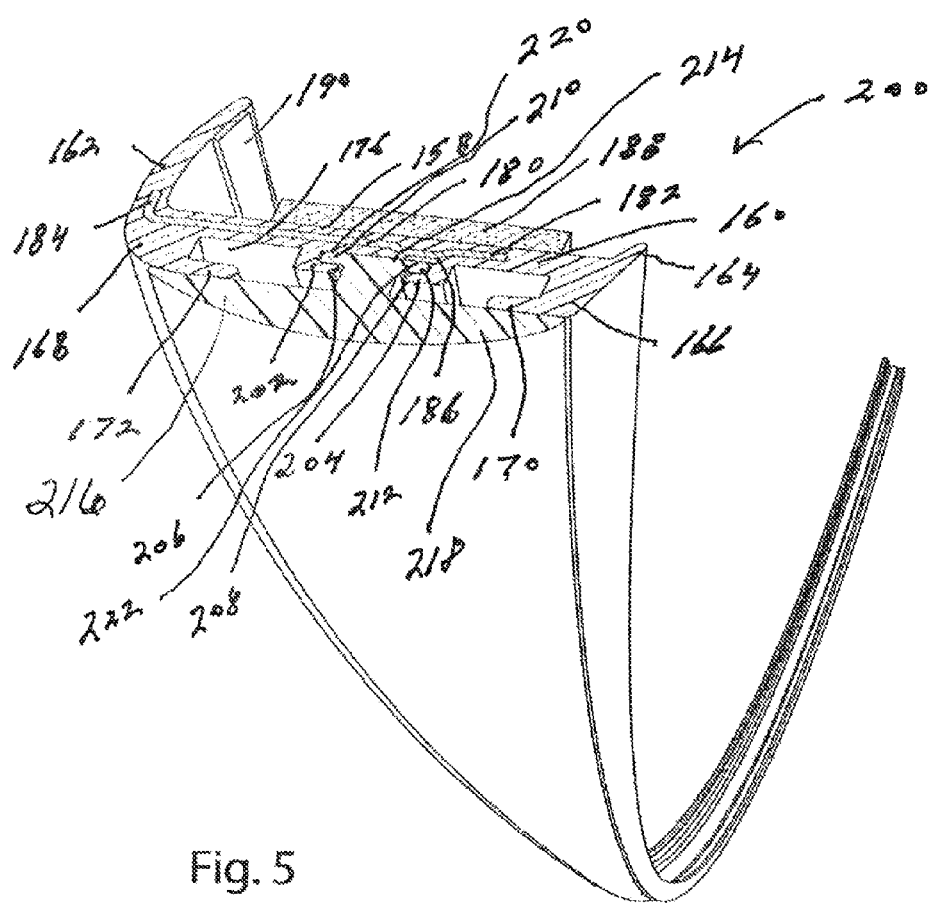
FIG. 5 is a perspective and stand-alone view of an alternative embodiment of a corner rail extrusion in accordance with the invention, and showing a differing configuration within the slot of the corner rail extrusion, and the use of a mushroom cap-shaped element in place of the vinyl gimp shown in FIGS. 2 and 3.

An alternative embodiment to the corner rail assembly 156 described in the foregoing paragraphs is described in the following paragraphs and comprises a corner rail assembly 200 as primarily illustrated in FIG. 5. A substantial portion of the corner rail assembly 200 is similar in structure and function to the previously described corner rail assembly 156. Primary distinctions of assembly 200 relative to assembly 156 relate to the omission of the vinyl gimp 192, the addition of a structure so as to form an inner channel 214, and the addition of a mushroom-shaped insert or cap 216. However, it should be emphasized that the overall shape and structure of the assembly 200 (including the mushroom-shaped insert or cap 216) in accordance with the invention are not limited to the particular designs described herein. That is, for example, numerous other ornamental designs may be utilized in place of the "mushroom shape" of the cap 216, again without departing from the spirit and scope of the novel concepts of the invention. Those elements of corner rail assembly 200 which are substantially similar to corresponding elements of corner rail assembly 156 are numbered with identical numerical references, and will not be described in detail with respect to assembly 200, in view of the prior description relative to assembly 156. Among these elements are the main jacket 158, main body 160 and first and second legs 162, 164. Also substantially identical are first and second outer projections 166, 168, respectively, first and second lips 170, 172, respectively, and first and second slots 174, 176, respectively. In addition, the corner rail assembly 200 also includes the metal insert 180, comprising a main body 182, lip 184 and convex section 186. Also included in assembly 156 is a securing tape 188 and an outside leg tape 190.

As earlier mentioned, a vinyl gimp is omitted from the rail assembly 200. Instead, between the first and second slots 174, 176, respectively, a first inner projection 202 extends outwardly from the main body 160. A second inner projection 204 spaced apart from the first inner projection 202 also extends outwardly from the main body 160. Integrally formed at the ends of the first and second inner projections 202, 204, respectively, are first inner lip 206 (projecting from first inner projection 202) and second inner lip 208 (projecting from second inner projection 204). A portion of the main body 160, the first inner projection 202 and the first inner lip 206 form a first inner slot 210. Correspondingly, a portion of the main body 160, second inner projection 204 and second inner lip 208 form a second inner slot 212. The first and second slots 210, 212, respectively, form an inner channel 214 which includes an outward opening between the ends of the first and second inner lips 206, 208, respectively.

The mushroom-shaped insert or cap 216 includes a curved main body 218. The curved main body 218 has a mushroom cap shape and extends in a convex manner outwardly from the rail assembly 200. Integrally formed with the main body 218 is a T-shaped structure 224. The T-shaped structure 224 extends toward the jacket 158. Projecting laterally outward from the T-shaped structure 224 is a first projection 220 and a second projection 222. The first projection 220 is captured within the first slot 210. Correspondingly, the second projection 222 is captured within the second slot 212. The mushroom cap 218 is of sufficient width so as to overlap, at its ends, with the first lip 170 and the second lip 172 of the jacket 158. With the use of the mushroom-shaped insert 216, the vinyl gimp associated with the corner rail assembly 156 is eliminated. This cap configuration will also allow the mixing and matching of colors to correspond with color schemes of the entirety of the RV 100 itself. This configuration also eliminates all fasteners and tends to create a relatively "more automotive" appearance. Still further, the structural configuration of the cap 216 essentially corrects what could be characterized as a "watershed" issue which is associated with prior designs that utilize a gimp. That is, the design of the cap 216 essentially allows water to shed appropriately off of the corner rail, when the vehicle is being towed or otherwise during a storm.

As earlier described herein, the corner rail assembly 156 and the corner rail assembly 200 provide a number of significant advantages over the known art. For example, these corner rail extrusions or assemblies in accordance with the invention eliminate the need for screws or other types of mechanical fasteners. In view of the elimination of the necessity of these types of connecting elements, the assemblies in accordance with the invention also eliminate holes and other leak paths for liquids. In addition, the assemblies accommodate potential mismatch of RV walls which may occur during assembly.

Still further, assemblies in accordance with the invention eliminate the need for butyl tape and the requirement for caulk. The legs of the assembly are permanently adhered to the RV unit, with the use of known high quality tapes or liquid adhesive or the functional equivelant, such as those commercially available from and manufactured by 3M™. Still further, installation time is reduced. In addition, the use of the metal insert 180 provides for dimensional stability throughout temperature cycles. Also, the legs of the corner rail assemblies, they provide for a self-sealing characteristic. Still further, the mushroom cap design shown with respect to the corner rail assembly 200 allows for a color matching with decals and similar items. The assemblies in accordance with the invention further provide for ease of replacement and repair with track insert designs. In addition to the aforedescribed functional advantages, certain of the assemblies in accordance with the invention provide additional benefits. For example, and as earlier described in greater detail, the cap 216 functions so as to correct watershed issues associated with designs that utilize gimp. Still further, the cosmetics of the invention provide for a substantially pleasing aesthetic appearance.

It will be apparent to those skilled in the pertinent arts that other embodiments of corner rail extrusions in accordance with the invention can be designed. That is, the principles of corner rail extrusions in accordance with the invention are not limited to the specific embodiments described herein. Accordingly, it will be apparent to those skilled in the art that modifications and other variations of the above-described illustrative embodiments of the invention may be effected without departing from the spirit and scope of the novel concept of the invention.

The invention claimed is:

1. A corner rail assembly applied to a corner section of a vehicle selected from one of a recreational vehicle, a motorized trailer or a towable trailer for sealing said corner section and protecting against moisture leakage, with said corner section comprising stud-like elements mounting and supporting walls of said vehicle, and with said walls comprising at least a first wall and a second wall, said corner section formed at an intersection of said first and second walls;

said corner rail assembly comprising:
a jacket having UV stability and paintable, said jacket comprising a first leg which overlaps a portion of said first wall, a second leg which abuts said second wall and functions so as to create a positive seal against said second wall, and a main body positioned intermediate said first leg and said second leg;
means for adhering said first leg to said first wall;
means positioned intermediate said main body and said second wall, for securing said jacket to said second wall; and
said means for adhering and said means for securing affix said corner rail assembly to said first and second walls, without screws, mechanical fasteners or other connecting means which would require the formation of holes and/or leak paths.

2. A corner rail assembly in accordance with claim 1, characterized in that said means for adhering said first leg to said first wall comprises an elongated two-sided tape.

3. A corner rail assembly in accordance with claim 1, characterized in that said means for securing said jacket to said second wall comprises an elongated two-sided tape or liquid adhesive.

4. A corner rail assembly in accordance with claim 1, characterized in that said jacket is manufactured through an extrusion process and is composed of PVC material.

5. A corner rail assembly in accordance with claim 1, characterized in that said first leg is substantially longer than said second leg.

6. A corner rail assembly in accordance with claim 1, characterized in that said assembly further comprises:
an elongated channel located outwardly from said main body of said jacket; and
a gimp having an elongated configuration, and adapted to be releasably received within said elongated channel.

7. A corner rail assembly in accordance with claim 6, characterized in that said gimp is composed of vinyl material.

8. A corner rail assembly in accordance with claim 6, characterized in that said assembly further comprises:
a first outer projection extending outwardly from one end of said main body of said jacket;
a second outer projection extending outwardly from an opposing end of said main body of said jacket;
a first lip extending laterally from said first outer projection;
a second lip extending laterally from said second outer projection, and extending toward said first lip;
a first slot formed by a portion of said main body of said jacket, said first outer projection and said first lip;
a second slot formed by a further portion of said main body of said jacket, said second outer projection and said second lip; and
said channel is formed by said first slot, said second slot and an interior area formed therebetween.

9. A corner rail assembly in accordance with claim 8, characterized in that said gimp has one end thereof received within said first slot and an opposing end thereof received within said second slot.

10. A corner rail assembly in accordance with claim 1, characterized in that said rail assembly is constructed and secured to said corner section without the use of butyl tape or caulk.

11. A corner rail assembly in accordance with claim 1, characterized in that the sizing, construction and configuration of said corner rail assembly accommodates for mismatch of said first and second walls during assembly.

12. A corner rail assembly in accordance with claim 1, characterized in that said rail assembly further comprises a mushroom-shaped cap releasably received within said elements of said corner rail assembly, and substantially covering an exterior of said corner rail assembly, said mushroom cap functioning so as to allow for color matching with decals, and further functioning so as to be readily replaceable and repairable.

13. A corner rail assembly in accordance with claim 12, characterized in that said mushroom cap eliminates any need for a gimp to be associated with said corner rail assembly.

14. A corner rail assembly in accordance with claim 12, characterized in that said assembly further comprises:
   a first inner projection extending outwardly from said main body of said jacket;
   a second inner projection extending outwardly from said main body of said jacket, and positioned in a spaced-apart relationship relative to said first inner projection;
   a first inner lip extending laterally from an end of said first inner projection;
   a second inner lip extending laterally from said second inner projection, said second inner lip projecting toward said first inner lip;
   a first inner slot formed by a portion of said main body of said jacket, said first inner projection and said first inner lip;
   a second inner slot having an opening facing said first slot and formed from another portion of said main body of said jacket, said second inner projection and said second inner lip;
   an inner channel formed by said first inner slot, said second inner slot and a spatial area positioned therebetween; and
   said mushroom cap is releasably received within said inner channel.

15. A corner rail assembly in accordance with claim 14, characterized in that said mushroom cap comprises:
   a mushroom-shaped portion having a convex configuration facing outwardly from said main body of said jacket, and substantially centered relative to said inner channel;
   a T-shaped structure extending inwardly toward said main body of said jacket and integral with or otherwise connected to said curved main body of said convex section; and
   said T-shaped structure comprising a first projection which is adapted to be releaseably received within said first inner slot, and a second projection adapted to be releasably received within said second inner slot.

16. A corner rail assembly in accordance with claim 15, characterized in that said assembly further comprises:
   a first outer projection extending outwardly from one end of said main body of said jacket;
   a second outer projection extending outwardly from an opposing end of said main body of said jacket;
   a first lip extending laterally from an end of said first outer projection;
   a second lip extending laterally from an end of said second outer projection, said second lip directly facing said first lip;
   a first slot formed by a portion of said main body of said jacket, said first outer projection and said first lip;
   a second slot formed by another portion of said main body of said jacket, said second outer projection and said second lip;
   a channel formed by said first slot, said second slot and a spatial area located therebetween; and
   said inner channel is formed within said channel and is substantially centered therein.

17. A corner rail assembly applied to a corner section of a vehicle selected from one of a recreational vehicle, a motorized trailer or a towable trailer, for sealing said corner section and protecting against moisture leakage, with said corner section comprising stud-like elements mounting and supporting walls of said vehicle, and with said walls comprising at least a first wall and a second wall, said corner section formed at an intersection of said first and second walls;
   said corner rail assembly comprising:
      a jacket comprising a first leg which overlaps a portion of said first wall, a second leg which abuts said second wall, and a main body positioned intermediate said first leg and said second leg;
      means for adhering said first leg to said first wall;
      means positioned intermediate said main body and said second wall, for securing said jacket to said second wall; and
      a metal insert formed within an extrusion of said jacket, said insert functioning so as to maintain dimensional stability of said corner rail assembly during differing temperature cycles.

18. A corner rail assembly in accordance with claim 17, characterized in that said metal insert comprises:
   an elongated main body;
   a lip extending angularly from one end of said main body of said metal insert; and
   a convex section protruding outwardly from said second wall, and adjacent an end of said metal insert opposing said end of said metal insert to which said lip of said metal insert is integrally formed.

* * * * *